(12) United States Patent
Beard (10) Patent No.: US 7,895,098 B2
(45) Date of Patent: Feb. 22, 2011

(54) SYSTEM AND METHOD FOR MEASURING AND UTILIZING POOLING ANALYTICS

(75) Inventor: Mark L. Beard, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 2322 days.

(21) Appl. No.: 10/087,385

(22) Filed: Mar. 1, 2002

(65) Prior Publication Data

US 2002/0178098 A1 Nov. 28, 2002

Related U.S. Application Data (60) Provisional application No. 60/272,546, filed on Mar. 1, 2001.

(51) Int. Cl.
*G06F 17/60* (2006.01)

(52) U.S. Cl. ............... 705/35; 705/38; 705/45; 707/104.1; 707/E17.045; 370/229; 370/389

(58) Field of Classification Search ............... 705/1–80; 707/104.1, E17.045; 370/229–389; 382/298; 29/825

See application file for complete search history.

(56) References Cited

U.S. PATENT DOCUMENTS

| | | | |
|---|---|---|---|
| 3,634,669 A | 1/1972 | Soumas et al. | |
| 4,254,474 A | 3/1981 | Cooper et al. | |
| 4,338,587 A | 7/1982 | Chiappetti | |
| 4,346,442 A | 8/1982 | Musmanno | |
| 4,355,372 A | 10/1982 | Goldberg et al. | |

(Continued)

FOREIGN PATENT DOCUMENTS

EP 0597316 5/1994

(Continued)

OTHER PUBLICATIONS

Quail Creek Bank Personnel, Rates, http://web.archive.org/web/20000305204031/http://quailcreekbank.com/rates.html, Mar. 5, 2000, pp. 1-3.*

(Continued)

*Primary Examiner*—Mary Cheung
*Assistant Examiner*—Marissa Liu
(74) *Attorney, Agent, or Firm*—Hunton & Williams, LLP (57) ABSTRACT

A system and method for quantifying the working capital benefit of pooling a number of separate cash accounts. The average (mean) cash balance of the pooled account is determined to be the sum of the means of each of the individual accounts. Similarly, the standard deviation of the pooled account is determined to be the square root of the sum of the squares of the standard deviations of the individual accounts. Accordingly, the minimum cash level of the pooled account is 2.3 times the square root of the sum of the squares of the standard deviations of the individual accounts. In order to determine the benefit of pooling, the present invention determines the difference between the minimum aggregate cash required by the separate companies and the minimum cash required in the pooled account. If pooling is to be beneficial, from a working capital perspective, the minimum cash required in the pooled account will be significantly less than the aggregate cash required by the separate companies.

16 Claims, 4 Drawing Sheets

U.S. PATENT DOCUMENTS

| | | | |
|---|---|---|---|
| 4,363,489 A | 12/1982 | Chodak et al. | |
| 4,376,978 A | 3/1983 | Musmanno | |
| 4,597,046 A | 6/1986 | Musmanno et al. | |
| 4,598,367 A | 7/1986 | DeFrancesco et al. | |
| 4,642,768 A | 2/1987 | Roberts | |
| 4,674,042 A | 6/1987 | Hernandez et al. | |
| 4,674,044 A | 6/1987 | Kalmus et al. | |
| 4,736,294 A | 4/1988 | Le Grand et al. | |
| 4,739,478 A | 4/1988 | Roberts et al. | |
| 4,750,121 A | 6/1988 | Halley et al. | |
| 4,752,676 A | 6/1988 | Leonard et al. | |
| 4,760,604 A | 7/1988 | Cooper | |
| 4,774,663 A | 9/1988 | Musmanno et al. | |
| 4,774,664 A | 9/1988 | Gottardy | |
| 4,831,526 A | 5/1989 | Luchs | |
| 4,859,187 A | 8/1989 | Peterson | |
| 4,859,837 A | 8/1989 | Halpern | |
| 4,866,634 A | 9/1989 | Reboh | |
| 4,897,811 A | 1/1990 | Scofield | |
| 4,903,201 A * | 2/1990 | Wagner | 705/37 |
| 4,969,094 A | 11/1990 | Halley et al. | |
| 4,972,504 A | 11/1990 | Daniel, Jr. | |
| 5,007,084 A | 4/1991 | Materna et al. | |
| 5,025,372 A | 6/1991 | Burton et al. | |
| 5,041,972 A | 8/1991 | Frost | |
| 5,056,019 A | 10/1991 | Schultz et al. | |
| 5,093,907 A | 3/1992 | Hwong et al. | |
| 5,122,950 A | 6/1992 | Mee | |
| 5,164,904 A | 11/1992 | Sumner | |
| 5,175,682 A | 12/1992 | Higashiyama et al. | |
| 5,189,608 A | 2/1993 | Lyons et al. | |
| 5,220,500 A | 6/1993 | Baird | |
| 5,220,501 A | 6/1993 | Lawlor | |
| 5,227,874 A | 7/1993 | Von Kohorn | |
| 5,231,571 A | 7/1993 | D'Agostino | |
| 5,237,620 A | 8/1993 | Deaton | |
| 5,245,535 A | 9/1993 | Weiss et al. | |
| 5,278,751 A | 1/1994 | Adiano | |
| 5,297,032 A | 3/1994 | Trojan et al. | |
| 5,311,594 A | 5/1994 | Penzias | |
| 5,321,933 A | 6/1994 | Seifert et al. | |
| 5,351,187 A | 9/1994 | Hassett | |
| 5,381,470 A | 1/1995 | Cambray et al. | |
| 5,396,621 A | 3/1995 | MacGregor et al. | |
| 5,424,938 A | 6/1995 | Wagner et al. | |
| 5,430,644 A | 7/1995 | Deaton et al. | |
| 5,444,844 A | 8/1995 | Inoue | |
| 5,448,471 A | 9/1995 | Deaton et al. | |
| 5,481,647 A | 1/1996 | Brody | |
| 5,483,444 A | 1/1996 | Malark | |
| 5,490,060 A | 2/1996 | Malec | |
| 5,502,805 A | 3/1996 | Anderson et al. | |
| 5,513,102 A | 4/1996 | Auriemma | |
| 5,523,942 A | 6/1996 | Tyler | |
| 5,537,314 A | 7/1996 | Kanter | |
| 5,550,734 A | 8/1996 | Tater | |
| 5,551,021 A | 8/1996 | Harada | |
| 5,583,778 A | 12/1996 | Wind | |
| 5,592,590 A | 1/1997 | Jolly | |
| 5,603,025 A | 2/1997 | Tabb | |
| 5,606,496 A | 2/1997 | D'Agostino | |
| 5,611,052 A | 3/1997 | Dykstra | |
| 5,615,109 A | 3/1997 | Eder | |
| 5,615,341 A | 3/1997 | Srikant et al. | |
| 5,621,812 A | 4/1997 | Deaton et al. | |
| 5,623,591 A | 4/1997 | Cseri | |
| 5,638,457 A | 6/1997 | Deaton et al. | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,116 A | 7/1997 | McCoy | |
| 5,649,118 A | 7/1997 | Carlisle et al. | |
| 5,652,786 A | 7/1997 | Rogers | |
| 5,655,085 A | 8/1997 | Ryan | |
| 5,657,388 A | 8/1997 | Weiss | |
| 5,657,437 A | 8/1997 | Bishop et al. | |
| 5,657,460 A | 8/1997 | Egan et al. | |
| 5,659,469 A | 8/1997 | Deaton et al. | |
| 5,664,127 A | 9/1997 | Anderson et al. | |
| 5,671,363 A | 9/1997 | Cristofich et al. | |
| 5,675,746 A | 10/1997 | Marshall | |
| 5,687,322 A | 11/1997 | Deaton et al. | |
| 5,689,100 A | 11/1997 | Carrithers et al. | |
| 5,689,650 A | 11/1997 | McClelland et al. | |
| 5,704,044 A | 12/1997 | Tarter et al. | |
| 5,710,889 A | 1/1998 | Clark et al. | |
| 5,715,298 A | 2/1998 | Rogers | |
| 5,717,865 A | 2/1998 | Stratmann | |
| 5,721,847 A | 2/1998 | Johnson | |
| 5,727,161 A | 3/1998 | Purcell, Jr. | |
| 5,732,397 A | 3/1998 | DeTore | |
| 5,734,838 A | 3/1998 | Robinson | |
| 5,758,328 A | 5/1998 | Giovannoli | |
| 5,764,923 A | 6/1998 | Tallman et al. | |
| 5,765,144 A | 6/1998 | Larche | |
| 5,768,158 A | 6/1998 | Adler et al. | |
| 5,774,878 A | 6/1998 | Marshall | |
| 5,774,883 A | 6/1998 | Andersen et al. | |
| 5,787,403 A | 7/1998 | Randle | |
| 5,799,286 A | 8/1998 | Morgan et al. | |
| 5,799,288 A * | 8/1998 | Tanaka et al. | 705/43 |
| 5,802,502 A | 9/1998 | Gell | |
| 5,812,968 A | 9/1998 | Hassan et al. | |
| 5,819,237 A | 10/1998 | Garman | |
| 5,832,457 A | 11/1998 | O'Brien | |
| 5,842,178 A | 11/1998 | Giovannoli | |
| 5,848,400 A | 12/1998 | Chang | |
| 5,852,811 A | 12/1998 | Atkins | |
| 5,870,456 A | 2/1999 | Rogers | |
| 5,870,721 A | 2/1999 | Norris | |
| 5,873,096 A | 2/1999 | Lim | |
| 5,875,437 A | 2/1999 | Atkins | |
| 5,878,258 A | 3/1999 | Pizi | |
| 5,878,403 A | 3/1999 | Agrawal et al. | |
| 5,893,079 A | 4/1999 | Cwenar | |
| 5,913,202 A | 6/1999 | Motoyama | |
| 5,918,217 A | 6/1999 | Maggioncalda | |
| 5,920,848 A | 7/1999 | Schutzer et al. | |
| 5,930,775 A | 7/1999 | McCauley | |
| 5,940,811 A | 8/1999 | Norris | |
| 5,940,812 A | 8/1999 | Tengel et al. | |
| 5,949,044 A | 9/1999 | Walker et al. | |
| 5,950,175 A | 9/1999 | Austin | |
| 5,963,953 A | 10/1999 | Cram et al. | |
| 5,970,467 A | 10/1999 | Alavi | |
| 5,970,480 A | 10/1999 | Kalina | |
| 5,974,396 A | 10/1999 | Anderson | |
| 5,978,779 A | 11/1999 | Stein et al. | |
| 5,983,206 A | 11/1999 | Oppenheimer | |
| 5,987,434 A | 11/1999 | Libman | |
| 5,991,736 A | 11/1999 | Ferguson et al. | |
| 5,991,741 A | 11/1999 | Speakman et al. | |
| 5,995,942 A | 11/1999 | Smith et al. | |
| 5,999,907 A | 12/1999 | Donner | |
| 6,006,205 A | 12/1999 | Loeb et al. | |
| 6,008,817 A | 12/1999 | Gilmore, Jr. | |
| 6,009,411 A | 12/1999 | Kepecs | |
| 6,009,415 A | 12/1999 | Shurling et al. | |
| 6,018,718 A | 1/2000 | Walker et al. | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |

| | | | |
|---|---|---|---|
| 6,029,153 A | 2/2000 | Bauchner et al. | |
| 6,029,195 A | 2/2000 | Herz | |
| 6,032,125 A | 2/2000 | Ando | |
| 6,032,136 A | 2/2000 | Brake, Jr. et al. | |
| 6,044,371 A | 3/2000 | Person et al. | |
| 6,055,510 A | 4/2000 | Henrick | |
| 6,055,517 A | 4/2000 | Friend et al. | |
| 6,064,985 A | 5/2000 | Anderson | |
| 6,070,147 A | 5/2000 | Harms et al. | |
| 6,073,115 A | 6/2000 | Marshall | |
| 6,076,072 A | 6/2000 | Libman | |
| 6,078,892 A | 6/2000 | Anderson et al. | |
| 6,078,901 A | 6/2000 | Ching | |
| 6,088,686 A | 7/2000 | Walker et al. | |
| 6,089,284 A | 7/2000 | Kaehler et al. | |
| 6,092,050 A | 7/2000 | Lungren et al. | |
| 6,097,391 A | 8/2000 | Wilcox | |
| 6,105,007 A | 8/2000 | Norris | |
| 6,108,641 A | 8/2000 | Kenna et al. | |
| 6,119,933 A | 9/2000 | Wong et al. | |
| 6,122,623 A | 9/2000 | Garman | |
| 6,128,599 A | 10/2000 | Walker et al. | |
| 6,141,666 A | 10/2000 | Tobin | |
| 6,154,731 A | 11/2000 | Monks et al. | |
| 6,161,098 A | 12/2000 | Wallman | |
| 6,173,270 B1 | 1/2001 | Cristofich et al. | |
| 6,178,408 B1 | 1/2001 | Copple et al. | |
| 6,182,059 B1 | 1/2001 | Angotti et al. | |
| 6,183,140 B1 | 2/2001 | Singer et al. | |
| 6,185,582 B1 | 2/2001 | Zellweger et al. | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,189,787 B1 | 2/2001 | Dorf | |
| 6,195,092 B1 | 2/2001 | Dhond et al. | |
| 6,195,644 B1 | 2/2001 | Bowie | |
| 6,199,077 B1 | 3/2001 | Inala et al. | |
| 6,202,053 B1 | 3/2001 | Christiansen et al. | |
| 6,202,054 B1 | 3/2001 | Lawlor et al. | |
| 6,205,453 B1 | 3/2001 | Tucker et al. | |
| 6,212,494 B1 | 4/2001 | Boguraev | |
| 6,222,557 B1 | 4/2001 | Pulley, IV et al. | |
| 6,222,914 B1 | 4/2001 | McMullin | |
| 6,235,176 B1 | 5/2001 | Schoen et al. | |
| 6,236,978 B1 | 5/2001 | Tuzhilin | |
| 6,243,093 B1 | 6/2001 | Czerwinski et al. | |
| 6,243,688 B1 | 6/2001 | Kalina | |
| 6,249,775 B1 | 6/2001 | Freeman et al. | |
| 6,256,649 B1 | 7/2001 | Mackinlay et al. | |
| 6,263,320 B1 | 7/2001 | Danilunas et al. | |
| 6,267,292 B1 | 7/2001 | Walker et al. | |
| 6,269,346 B1 | 7/2001 | Cristofich et al. | |
| 6,271,863 B1 | 8/2001 | Bose et al. | |
| 6,278,981 B1 | 8/2001 | Dembo et al. | |
| 6,278,996 B1 | 8/2001 | Richardson et al. | |
| 6,282,551 B1 | 8/2001 | Anderson et al. | |
| 6,292,786 B1 | 9/2001 | Deaton et al. | |
| 6,304,859 B1 | 10/2001 | Ryan et al. | |
| 6,311,144 B1 | 10/2001 | Abu El Ata | |
| 6,317,726 B1 | 11/2001 | O'Shaughnessy | |
| 6,317,750 B1 | 11/2001 | Tortolani et al. | |
| 6,321,212 B1 | 11/2001 | Lange | |
| 6,324,524 B1 | 11/2001 | Lent et al. | |
| 6,324,526 B1 | 11/2001 | D'Agostino | |
| 6,327,573 B1 | 12/2001 | Walker et al. | |
| 6,330,543 B1 | 12/2001 | Kepecs | |
| 6,330,551 B1 | 12/2001 | Burchetta et al. | |
| 6,349,290 B1 | 2/2002 | Horowitz et al. | |
| 6,349,291 B1 | 2/2002 | Varma | |
| 6,360,188 B1 | 3/2002 | Freidman et al. | |
| 6,363,393 B1 | 3/2002 | Ribitzky | |
| 6,374,231 B1 | 4/2002 | Bent et al. | |
| 6,390,472 B1 | 5/2002 | Vinarsky | |
| 6,401,079 B1 | 6/2002 | Kahn et al. |
| 6,405,175 B1 | 6/2002 | Ng |
| 6,405,181 B2 | 6/2002 | Lent et al. |
| 6,405,204 B1 | 6/2002 | Baker et al. |
| 6,409,080 B2 | 6/2002 | Kawagishi |
| 6,411,939 B1 | 6/2002 | Parsons |
| 6,411,947 B1 | 6/2002 | Rice et al. |
| 6,424,949 B1 | 7/2002 | Deaton et al. |
| 6,424,951 B1 | 7/2002 | Shurling et al. |
| 6,452,613 B1 | 9/2002 | Lefebvre et al. |
| 6,473,745 B2 | 10/2002 | Doerr et al. |
| 6,490,569 B1 | 12/2002 | Grune et al. |
| 6,496,832 B2 | 12/2002 | Chi et al. |
| 6,502,080 B1 | 12/2002 | Eichorst et al. |
| 6,513,018 B1 | 1/2003 | Culhane |
| 6,513,019 B2 | 1/2003 | Lewis |
| 6,564,189 B1 | 5/2003 | Nycz |
| 6,567,791 B2 | 5/2003 | Lent et al. |
| 6,571,216 B1 | 5/2003 | Garg et al. |
| 6,578,012 B1 | 6/2003 | Storey |
| 6,594,640 B1 | 7/2003 | Postrel |
| 6,597,379 B1 | 7/2003 | Morris et al. |
| 6,601,044 B1 | 7/2003 | Wallman |
| 6,624,752 B2 | 9/2003 | Klitsgaard et al. |
| 6,671,673 B1 | 12/2003 | Baseman et al. |
| 6,721,743 B1 | 4/2004 | Sakakibara |
| 6,725,257 B1 | 4/2004 | Cansler et al. |
| 6,738,933 B2 | 5/2004 | Fraenkel et al. |
| 6,741,975 B1 | 5/2004 | Nakisa et al. |
| 6,785,661 B1 | 8/2004 | Mandler et al. |
| 6,820,061 B2 | 11/2004 | Postrel |
| 6,829,586 B2 | 12/2004 | Postrel |
| 6,842,739 B2 | 1/2005 | Postrel |
| 6,850,923 B1 | 2/2005 | Nakisa et al. |
| 6,865,547 B1 | 3/2005 | Brake, Jr. et al. |
| 6,889,198 B2 | 5/2005 | Kawan |
| 6,892,052 B2 | 5/2005 | Kotola et al. |
| 6,901,375 B2 | 5/2005 | Fernandez |
| 6,913,193 B1 | 7/2005 | Kawan |
| 6,915,271 B1 | 7/2005 | Meyer et al. |
| 6,920,611 B1 | 7/2005 | Spaeth et al. |
| 6,947,898 B2 | 9/2005 | Postrel |
| 6,957,191 B1 | 10/2005 | Belcsak et al. |
| 6,963,852 B2 | 11/2005 | Koresko |
| 6,970,830 B1 | 11/2005 | Samra et al. |
| 6,985,879 B2 | 1/2006 | Walker et al. |
| 6,985,880 B1 | 1/2006 | Hodgdon et al. |
| 6,999,938 B1 | 2/2006 | Libman |
| 6,999,943 B1 | 2/2006 | Johnson et al. |
| 7,006,978 B2 | 2/2006 | Lineberry et al. |
| 7,090,138 B2 | 8/2006 | Rettenmyer et al. |
| 7,107,243 B1 | 9/2006 | McDonald et al. |
| 7,121,471 B2 | 10/2006 | Beenau et al. |
| 7,124,105 B2 | 10/2006 | Hilton |
| 7,133,846 B1 | 11/2006 | Ginter et al. |
| 7,181,427 B1 | 2/2007 | DeFrancesco et al. |
| 7,206,768 B1 | 4/2007 | deGroeve et al. |
| 7,249,097 B2 | 7/2007 | Hutchison et al. |
| 7,249,099 B2 | 7/2007 | Ling |
| 7,256,903 B2 | 8/2007 | Ando |
| 7,302,413 B1 | 11/2007 | Bent et al. |
| 7,318,046 B1 | 1/2008 | Wellons et al. |
| 7,333,948 B2 | 2/2008 | Bell et al. |
| 7,349,866 B2 | 3/2008 | Schwarz |
| 7,349,877 B2 | 3/2008 | Ballow et al. |
| 7,366,698 B1 | 4/2008 | Loy |
| 7,380,707 B1 | 6/2008 | Fredman |
| 7,398,245 B1 | 7/2008 | Bent et al. |
| 7,406,442 B1 | 7/2008 | Kottmeier, Jr. |
| 7,409,364 B1 | 8/2008 | Barton et al. |
| 7,444,301 B2 | 10/2008 | Conklin et al. |
| 7,467,096 B2 | 12/2008 | Antonucci et al. |
| 7,496,624 B2 | 2/2009 | Falter et al. |

| | | | | | | |
|---|---|---|---|---|---|---|
| 7,499,907 B2 | 3/2009 | Brown et al. | | 2002/0111850 A1 | 8/2002 | Smrckas et al. |
| 7,509,286 B1 | 3/2009 | Bent et al. | | 2002/0111859 A1 | 8/2002 | Sheldon et al. |
| 7,519,551 B2 | 4/2009 | Bent et al. | | 2002/0111860 A1 | 8/2002 | Jones |
| 7,536,350 B1 | 5/2009 | Bent et al. | | 2002/0111861 A1 | 8/2002 | Sakamoto et al. |
| 7,536,354 B1 | 5/2009 | deGroeve et al. | | 2002/0111890 A1 | 8/2002 | Sloan et al. |
| 7,546,272 B2 | 6/2009 | Loy | | 2002/0116266 A1 | 8/2002 | Marshall |
| 7,580,857 B2 | 8/2009 | VanFleet et al. | | 2002/0120497 A1 | 8/2002 | King |
| 7,630,935 B2 | 12/2009 | Loeger et al. | | 2002/0123926 A1 | 9/2002 | Bushold et al. |
| 7,668,771 B1 | 2/2010 | Bent et al. | | 2002/0123955 A1 | 9/2002 | Andreski et al. |
| 7,668,772 B1 | 2/2010 | Bent et al. | | 2002/0128916 A1 | 9/2002 | Beinecke |
| 7,672,866 B2 | 3/2010 | Venkatraman et al. | | 2002/0133383 A1 | 9/2002 | Chao et al. |
| 7,672,901 B1 | 3/2010 | Bent et al. | | 2002/0133401 A1 | 9/2002 | Mount et al. |
| 7,672,902 B1 | 3/2010 | Bent et al. | | 2002/0143614 A1 | 10/2002 | MacLean et al. |
| 7,680,716 B1 | 3/2010 | Bent et al. | | 2002/0143621 A1 | 10/2002 | Donnelly et al. |
| 7,680,734 B1 | 3/2010 | Bent et al. | | 2002/0143626 A1 | 10/2002 | Voltmer et al. |
| 7,689,504 B2 | 3/2010 | Warren et al. | | 2002/0147633 A1 | 10/2002 | Rafizadeh |
| 7,729,925 B2 | 6/2010 | Maritzen et al. | | 2002/0147668 A1 | 10/2002 | Smith et al. |
| 7,729,980 B2 | 6/2010 | Mittenzwei et al. | | 2002/0152118 A1 | 10/2002 | Hadjigeorgis |
| 7,734,518 B2 | 6/2010 | Toffey | | 2002/0152123 A1 | 10/2002 | Giordano et al. |
| 2001/0011243 A1* | 8/2001 | Dembo et al. ............... 705/36 | | 2002/0152179 A1 | 10/2002 | Racov |
| 2001/0023407 A1 | 9/2001 | Liyanearachchi et al. | | 2002/0161630 A1 | 10/2002 | Kern et al. |
| 2001/0025253 A1 | 9/2001 | Heintz et al. | | 2002/0161641 A1 | 10/2002 | Quinlan et al. |
| 2001/0027437 A1* | 10/2001 | Turbeville et al. ............ 705/38 | | 2002/0169671 A1 | 11/2002 | Junger |
| 2001/0034663 A1 | 10/2001 | Teveler et al. | | 2002/0174011 A1 | 11/2002 | Sanchez et al. |
| 2001/0034682 A1* | 10/2001 | Knight et al. ............... 705/35 | | 2002/0174016 A1 | 11/2002 | Cuervo |
| 2001/0037243 A1 | 11/2001 | Rouston et al. | | 2002/0174045 A1 | 11/2002 | Arena et al. |
| 2001/0037268 A1 | 11/2001 | Miller | | 2002/0178056 A1 | 11/2002 | Lim |
| 2001/0039511 A1 | 11/2001 | Duckworth et al. | | 2002/0188509 A1 | 12/2002 | Ariff et al. |
| 2001/0047342 A1 | 11/2001 | Cuervo | | 2002/0188511 A1 | 12/2002 | Johnson et al. |
| 2001/0049628 A1 | 12/2001 | Icho | | 2002/0194071 A1 | 12/2002 | Yoshizaki et al. |
| 2001/0049651 A1* | 12/2001 | Selleck ....................... 705/37 | | 2002/0198797 A1 | 12/2002 | Cooper et al. |
| 2001/0054003 A1 | 12/2001 | Chien et al. | | 2002/0198803 A1 | 12/2002 | Rowe |
| 2001/0056398 A1* | 12/2001 | Scheirer ..................... 705/38 | | 2003/0004794 A1 | 1/2003 | Hamilton |
| 2002/0002495 A1 | 1/2002 | Ullman | | 2003/0004803 A1 | 1/2003 | Glover et al. |
| 2002/0004742 A1 | 1/2002 | Willcocks et al. | | 2003/0004809 A1 | 1/2003 | Palcic et al. |
| 2002/0007313 A1 | 1/2002 | Mai et al. | | 2003/0009374 A1 | 1/2003 | Moodie et al. |
| 2002/0007330 A1 | 1/2002 | Kumar et al. | | 2003/0009379 A1 | 1/2003 | Narasimhan et al. |
| 2002/0010621 A1 | 1/2002 | Bell et al. | | 2003/0009393 A1 | 1/2003 | Norris |
| 2002/0011517 A1 | 1/2002 | Namekawa et al. | | 2003/0014265 A1 | 1/2003 | Landry et al. |
| 2002/0019791 A1 | 2/2002 | Goss et al. | | 2003/0018492 A1 | 1/2003 | Carlson |
| 2002/0019802 A1* | 2/2002 | Malme et al. ............... 705/37 | | 2003/0018523 A1 | 1/2003 | Rappaport et al. |
| 2002/0019803 A1 | 2/2002 | Muller | | 2003/0028466 A1 | 2/2003 | Jenson et al. |
| 2002/0032622 A1 | 3/2002 | Petit et al. | | 2003/0036952 A1 | 2/2003 | Panttaja et al. |
| 2002/0040344 A1 | 4/2002 | Preiser et al. | | 2003/0040964 A1 | 2/2003 | Lacek |
| 2002/0042742 A1 | 4/2002 | Glover et al. | | 2003/0050831 A1 | 3/2003 | Klayh |
| 2002/0042774 A1 | 4/2002 | Ortiz et al. | | 2003/0055754 A1 | 3/2003 | Sullivan |
| 2002/0046110 A1 | 4/2002 | Gallagher | | 2003/0061093 A1 | 3/2003 | Todd |
| 2002/0046116 A1 | 4/2002 | Hohle et al. | | 2003/0061097 A1 | 3/2003 | Walker et al. |
| 2002/0052778 A1 | 5/2002 | Murphy et al. | | 2003/0061098 A1 | 3/2003 | Meyer |
| 2002/0055874 A1 | 5/2002 | Williams | | 2003/0061132 A1 | 3/2003 | Yu, Sr. et al. |
| 2002/0059093 A1 | 5/2002 | Barton et al. | | 2003/0061137 A1 | 3/2003 | Leung et al. |
| 2002/0059103 A1 | 5/2002 | Anderson et al. | | 2003/0069808 A1 | 4/2003 | Cardno |
| 2002/0059139 A1 | 5/2002 | Evans | | 2003/0074167 A1 | 4/2003 | Browne et al. |
| 2002/0062253 A1 | 5/2002 | Dosh et al. | | 2003/0083933 A1 | 5/2003 | McAlear |
| 2002/0065735 A1 | 5/2002 | Hatakama et al. | | 2003/0088462 A1 | 5/2003 | Carrithers et al. |
| 2002/0067373 A1 | 6/2002 | Roe et al. | | 2003/0088470 A1 | 5/2003 | Cuervo |
| 2002/0069104 A1 | 6/2002 | Beach et al. | | 2003/0093351 A1 | 5/2003 | Sarabanchong |
| 2002/0069109 A1 | 6/2002 | Wendkos | | 2003/0097298 A1 | 5/2003 | Klimpl et al. |
| 2002/0070270 A1 | 6/2002 | Narita et al. | | 2003/0101131 A1 | 5/2003 | Warren et al. |
| 2002/0072931 A1 | 6/2002 | Card | | 2003/0105689 A1 | 6/2003 | Chandak et al. |
| 2002/0072974 A1 | 6/2002 | Pugliese et al. | | 2003/0115100 A1 | 6/2003 | Teicher |
| 2002/0073005 A1 | 6/2002 | Welnicki et al. | | 2003/0120544 A1 | 6/2003 | Gritzbach et al. |
| 2002/0077890 A1 | 6/2002 | LaPointe et al. | | 2003/0130895 A1 | 7/2003 | Antonucci et al. |
| 2002/0077895 A1 | 6/2002 | Howell | | 2003/0139827 A1 | 7/2003 | Phelps |
| 2002/0077904 A1 | 6/2002 | Ali | | 2003/0144902 A1 | 7/2003 | Bowie |
| 2002/0078086 A1* | 6/2002 | Alden et al. ................ 707/503 | | 2003/0158776 A1 | 8/2003 | Landesmann |
| 2002/0082920 A1 | 6/2002 | Austin et al. | | 2003/0158818 A1 | 8/2003 | George et al. |
| 2002/0087349 A1 | 7/2002 | Wong | | 2003/0171992 A1 | 9/2003 | Blagg et al. |
| 2002/0091567 A1 | 7/2002 | Royston | | 2003/0195780 A1 | 10/2003 | Arora et al. |
| 2002/0091622 A1 | 7/2002 | Mastwyk et al. | | 2003/0195805 A1 | 10/2003 | Storey |
| 2002/0091637 A1* | 7/2002 | Bent et al. ................... 705/40 | | 2003/0200141 A1 | 10/2003 | Robison |
| 2002/0099601 A1 | 7/2002 | Farrell | | 2003/0200142 A1 | 10/2003 | Hicks et al. |
| 2002/0107731 A1 | 8/2002 | Teng | | 2003/0205617 A1 | 11/2003 | Allen et al. |

| | | |
|---|---|---|
| 2003/0208400 A1 | 11/2003 | Kuo et al. |
| 2003/0212628 A1 | 11/2003 | Kuttan et al. |
| 2003/0216964 A1 | 11/2003 | MacLean et al. |
| 2003/0216965 A1 | 11/2003 | Libman |
| 2003/0216967 A1 | 11/2003 | Williams |
| 2003/0216998 A1 | 11/2003 | Chang et al. |
| 2003/0220834 A1 | 11/2003 | Leung et al. |
| 2003/0225618 A1 | 12/2003 | Hessburg et al. |
| 2003/0225619 A1 | 12/2003 | Dokken et al. |
| 2003/0229582 A1 | 12/2003 | Sherman et al. |
| 2003/0233278 A1 | 12/2003 | Marshall |
| 2003/0236704 A1 | 12/2003 | Antonucci |
| 2003/0236712 A1 | 12/2003 | Antonucci et al. |
| 2004/0006487 A1 | 1/2004 | Tari |
| 2004/0010447 A1 | 1/2004 | Asayama |
| 2004/0015394 A1 | 1/2004 | Mok et al. |
| 2004/0019540 A1 | 1/2004 | William et al. |
| 2004/0019541 A1 | 1/2004 | William et al. |
| 2004/0024665 A1 | 2/2004 | Foster |
| 2004/0030626 A1 | 2/2004 | Libman |
| 2004/0039588 A1 | 2/2004 | Libman |
| 2004/0039667 A1 | 2/2004 | Winklevoss et al. |
| 2004/0054610 A1 | 3/2004 | Amstutz et al. |
| 2004/0054622 A1 | 3/2004 | Strayer et al. |
| 2004/0078328 A1 | 4/2004 | Talbert et al. |
| 2004/0117300 A1 | 6/2004 | Jones et al. |
| 2004/0186773 A1 | 9/2004 | George et al. |
| 2004/0210498 A1 | 10/2004 | Freund |
| 2004/0215507 A1 | 10/2004 | Levitt et al. |
| 2004/0236641 A1 | 11/2004 | Abbott et al. |
| 2004/0236688 A1 | 11/2004 | Bozeman |
| 2004/0243468 A1 | 12/2004 | Cohagan et al. |
| 2004/0249660 A1 | 12/2004 | Williams et al. |
| 2004/0249710 A1 | 12/2004 | Smith et al. |
| 2004/0249712 A1 | 12/2004 | Brown et al. |
| 2004/0267651 A1 | 12/2004 | Jenson et al. |
| 2005/0004839 A1 | 1/2005 | Bakker et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0027632 A1 | 2/2005 | Zeitoun et al. |
| 2005/0033637 A1 | 2/2005 | Underwood |
| 2005/0049965 A1 | 3/2005 | Jen |
| 2005/0055270 A1 | 3/2005 | Broe |
| 2005/0060252 A1 | 3/2005 | Doddington |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0075889 A1 | 4/2005 | Gomes et al. |
| 2005/0080672 A1 | 4/2005 | Courtion et al. |
| 2005/0086103 A1 | 4/2005 | Agura et al. |
| 2005/0091104 A1 | 4/2005 | Abraham |
| 2005/0091138 A1 | 4/2005 | Awatsu |
| 2005/0096976 A1 | 5/2005 | Nelms |
| 2005/0102178 A1 | 5/2005 | Phillips et al. |
| 2005/0108090 A1 | 5/2005 | Takeda et al. |
| 2005/0108149 A1 | 5/2005 | Bent et al. |
| 2005/0119938 A1 | 6/2005 | Smith et al. |
| 2005/0125292 A1 | 6/2005 | Kassab et al. |
| 2005/0131761 A1 | 6/2005 | Trika et al. |
| 2005/0131792 A1 | 6/2005 | Rowe |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144108 A1 | 6/2005 | Loeper |
| 2005/0149386 A1 | 7/2005 | Agura et al. |
| 2005/0149393 A1 | 7/2005 | Leof |
| 2005/0160003 A1 | 7/2005 | Berardi et al. |
| 2005/0171839 A1 | 8/2005 | Corriere |
| 2005/0171842 A1 | 8/2005 | Tien et al. |
| 2005/0177503 A1 | 8/2005 | Thomas |
| 2005/0187820 A1 | 8/2005 | Mohan |
| 2005/0192862 A1 | 9/2005 | Modi |
| 2005/0197904 A1 | 9/2005 | Baron et al. |
| 2005/0203824 A1 | 9/2005 | Freud et al. |
| 2005/0205666 A1 | 9/2005 | Ward et al. |
| 2005/0209917 A1 | 9/2005 | Anderson et al. |
| 2005/0209939 A1 | 9/2005 | Joseph et al. |
| 2005/0216346 A1 | 9/2005 | Kusumoto et al. |
| 2005/0222906 A1 | 10/2005 | Chen |
| 2005/0228733 A1 | 10/2005 | Bent et al. |
| 2005/0234769 A1 | 10/2005 | Jain et al. |
| 2005/0234773 A1 | 10/2005 | Hirst et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0251446 A1 | 11/2005 | Jiang et al. |
| 2005/0251470 A1 | 11/2005 | Sullivan |
| 2005/0256794 A1 | 11/2005 | Colby |
| 2005/0267800 A1 | 12/2005 | Tietzen et al. |
| 2005/0273386 A1 | 12/2005 | Weidner |
| 2005/0273387 A1 | 12/2005 | Previdi |
| 2005/0278215 A1 | 12/2005 | Seele, Jr. |
| 2005/0288998 A1 | 12/2005 | Verma et al. |
| 2005/0289003 A1 | 12/2005 | Thompson et al. |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0020507 A1 | 1/2006 | Sagey |
| 2006/0026073 A1 | 2/2006 | Kenny et al. |
| 2006/0036553 A1 | 2/2006 | Gupta et al. |
| 2006/0212385 A2 | 9/2006 | Bent et al. |
| 2006/0212389 A2 | 9/2006 | Bent et al. |
| 2007/0011176 A1 | 1/2007 | Vishnubhotla |
| 2007/0061260 A1 | 3/2007 | deGroeve et al. |
| 2007/0271174 A2 | 11/2007 | Bent et al. |
| 2008/0046361 A2 | 2/2008 | Bent et al. |
| 2008/0120228 A1 | 5/2008 | Bent et al. |
| 2008/0228641 A1 | 9/2008 | Fredman |
| 2009/0150283 A2 | 6/2009 | Bent et al. |

FOREIGN PATENT DOCUMENTS

| | | |
|---|---|---|
| JP | 2002-109435 | 4/2002 |
| JP | 2002109435 | 4/2002 |
| JP | 2002-163589 | 6/2002 |
| JP | 2005-122748 | 5/2005 |
| WO | WO 99/27479 | 6/1999 |
| WO | WO 00/02256 | 1/2000 |
| WO | WO 01-011532 | 2/2001 |
| WO | WO 02/069212 | 9/2002 |

OTHER PUBLICATIONS

Articles re Cash Management in Multinational Corporates—(Copyrights 1995 and 2002).
Article re Cash Pooling—"Knowledge Management Applications" (1999).
International Search Report dated Feb. 25, 2003.
Roger et al., A Credit Scoring Model to Evaluate the Credit Worthiness of Credit Card Applicants, Developments in Marketing Science, vol. 5, 1982.
Pourmokhtar, A Hedge Fund Primer Version 0.1, www.emf.net/?farzin/hedgefund.html, printed Jul. 24, 2002, 5 pages.
At Your Request, www.wingspanbank.com, Sep. 28, 1999.
CSU/DSU (Channel Service Unit/Data Service Unit), CTI (Computer-Telephony Integration), pp. 208-210.
Markese, Can You Trust Mutual Fund Rankings?, Consumers' Research Magazine, vol. 76, No. 10, Research Library, Oct. 1993, p. 20.

Taylor et al., Card Issuers Turn to Scoring as They Face Increasing Risk, Financial Services Report, vol. 8, No. 15, Jul. 24, 1991, p. 1.

Quinn, Credit Card Issuers Keeping a Closer Watch on How You Pay Bills, Washington Post, Staying Ahead, Business Section P6, Apr. 25, 1988, 1 page.

Friedland, Credit Scoring Digs Deeper into Data, Credit World, vol. 84, No. 5, May 1996, pp. 19-23.

Credit Scoring New Markets, Bank Technology News, vol. 9, No. 7, Jul. 1996, p. 1.

Derivatives Primer, CEIBA, Association for Financial Professionals, Committee on Investment of Employee Benefit Assets, Dec. 2001.

Cumby et al., Evaluating the Performance of International Mutual Funds, The Journal of Finance, vol. 45, No. 2, Jun. 1990, pp. 497-521.

Jameson, Expanding Risk Management Strategies: Key to Future Survival, Credit World, vol. 84, No. 5, May 1996, pp. 16-18.

FreeMarkets, printed on Apr. 26, 1999.

Armstrong, Fund of Funds: Perfect Solution or Dangerous Shortcut?, Investor Solutions, Inc., www.investorsolutions.com, printed Jul. 24, 2002.

GS-Calc 6.0.1.1.; JPS Development; http://download.com, printed Sep. 3, 2003.

Gottfried et al., Graphical definitions: making spreadsheets visual through direct manipulation and gestures, Visual Languages, 1997, Proceedings, 1997 IEEE Symposium on, Sep. 23-26, 1997, pp. 246-253, Abstract.

Hedge Fund Primer—The Basics, KSP Capital Management LLC, information@kspcapital.com, printed Jul. 24, 2002, 18 pages.

Hedge Fund Primer About Fund of Funds, Links Securities LLC, www.hedgefund.net/prime_fof.php3, 2002, 2 pages.

Kneis, Hedge Fund Strategies: A Primer, Canadianhedgewatch, p. 3.

Buchner et al., HotDoc: a flexible framework for spatial composition, Visual Languages, 1997, Proceedings, 1997 IEEE Symposium, Abstract, Sep. 23-26, 1997, pp. 92-99.

Asch, How the RMA/Fair Isaac credit-scoring model was built, Journal of Commercial Lending, vol. 77, No. 10, Jun. 1995, pp. 10-16.

Huddling With William Bernstein: Small Town Doctor, Investing Pro.

Snyder et al., Identifying design requirements using analysis structures, Aerospace and Electronics Conference, 1991, NAECON, 1991, vol. 2, Abstract, May 20-24, 1991, pp. 786-792.

Meredith, Internet bank moves closer to virtual reality, USA Today, May 5, 1995.

Internet, Lending Tree, Mortgage Apply Online in Minutes, www.lendingtree.com, 7 pages, printed Feb. 1, 1999.

Makuch, Managing Consumer Credit Delinquency in the US Economy: A Multi-Billion Dollar Management Science Application, Interfaces, Feb. 1992, pp. 90-109.

Bogle, Mutual Funds at the Millennium: Fund Directors and Fund Myths, The Vanguard Group to the '40 Act Institute of PLI (Practicing Law Institute), New York, NY, May 15, 2000, 15 pages.

Davenport et al., Numbers-a medium that counts [spreadsheet software]; Computer Graphics and Applications; IEEE; vol. 11; Issue 4; Abstract, Jul. 1991, pp. 39-44.

Opportunity Knocks at Scoring's Door, Collection and Credit Risk, vol. 2, No. 4, Apr. 1997, p. 53.

Stolte et al., Polaris: a system for query, analysis, and visualization of multidimensional relational databases; Visualization and Computer Graphics; IEEE Transactions on; vol. 8; Issue 1; Abstract, Jan./Mar. 2002, pp. 52-65.

Primer: Derivatives Instruments, Derivatives Study Center, www.econstrat.org/dscinstruments.htm, printed Jul. 24, 2002, 8 pages.

Chi et al., Principles for information visualization spreadsheets; Computer Graphics and Applications; IEEE; vol. 18; Issue 4; Abstract, Jul./Aug. 1998, pp. 92-99.

Product Data Integration Technologies, Inc., Step Integratin Authors, printed on Apr. 26, 1999.

Sullivan, Scoring Borrower Risk, Mortage Banking, vol. 55, No. 2, Nov. 1994, pp. 94-98.

Spreadsheet Mapper; www.panopticon.com., printed Oct. 1, 2003.

TCS 4.20; Telsys sas; http://download.com, printed Sep. 30, 2003.

McLaughlin, Tapping Web to Search for Right Fund—FundProfiler Speeds Search, Boston Herald, Boston, MA, Dec. 16, 1999, p. 70.

Carey, The Sub-Prime Credit Market: Identifying Good Risks for Unsecured Cards, Credit World, vol. 85, No. 1, Sep. 1996, pp. 13-15.

Portner, There Must be a Better Way, Mortgage Banking, vol. 53, No. 2, Nov. 1, 1992, pp. 12-22.

Trading and Capital-Markets Activities Manual, Instrument Profiles: Structured Notes, Federal Reserve System, The Turin Group, www.toerien.com/books/manual/4040.htm, printed Jul. 24, 2002, 14 pages.

Storms, Phillip, Using Mortgage Credit to Achieve Client Objectives, Journal of Financial Planning, ISSN/ISBN: 10403981, Proquest Document ID: 10403981, vol. 9, Issue 5, 9 pages, Oct. 1996.

Storms, Phillip, Using Mortgage Credit to Achieve Client Objectives, Journal of Financial Planning, ISSN/ISBN: 10403981, Proquest document ID:10403981; Denver: vol. 9; Issue 5; 9 pages, Oct. 1996.

Hickman, Using Software to Soften Big-Time Competition, Bank Systems and Technology, vol. 31, No. 8, Jun. 1994, pp. 38-40.

Spoerri, Visual tools for information retrieval; Visual Languages; 1993; Proceedings; 1993 IEEE Symposium on; pp. 160-168; Abstract.

Spirer, When Bad Credit Behavior Becomes the Norm, Credit World, vol. 85, Iss. 6, Jul./Aug. 1997, p. 18.

Why A Fund of Funds?, Altegris Investments, www.managedinvestments.com/hedge_fund_of_funds, printed Jul. 24, 2002.

AmEx-Costco Co-brand Is it a Marketing or Merchant Acceptance Strategy.

Pae, Peter, Boycott Threat Spurs American Express to Rethink Fees.

Jazzy Jeff, Credit Card Commentaries; cardoffers.com 2003.

Kmart Mastercard - cardweb.com 2000.

Hinds, Michael, Making the Most of Fast Falling Mortgage Rates.

Reid, Alice, Metro Ready to Use High Tech Far System; Selling.

Anonymous, Two Chips Can Be Better Than One.

Hekman, Christine, A Financial Model of Foreign Exchange Exposure, Journal of International Business Studies, p. 83, Jun. 1985.

Schreiber, Ulrich et al., Measuring the Impact of Taxation on Investment and Financing Decisions, Schmalenbach Business Review, vol. 54, pp. 2-23, Jan. 2002.

* cited by examiner

SYSTEM AND METHOD FOR MEASURING AND UTILIZING POOLING ANALYTICS

CROSS-REFERENCE TO RELATED APPLICATIONS

This application is related to and claims priority to U.S. provisional patent application Ser. No. 60/272,546, filed Mar. 1, 2001, entitled SYSTEM AND METHOD FOR MEASURING AND UTILIZING POOLING ANALYTICS.

FIELD OF THE INVENTION

The present invention generally relates to systems and methods for pooling financial accounts and more particularly to a system and method for measuring the benefits accrued from pooling.

BACKGROUND OF THE INVENTION

Pooling is a financial method in which several different accounts of a customer are combined, "pooled" into a single account in order to obtain certain benefits. Some of these benefits include the ability to earn greater interested in the pooled account and decreased costs in maintaining the several accounts. For an example, a large corporation with several divisions or subsidiaries might consider pooling the cash accounts of the several divisions or subsidiaries to achieve interest and cost benefits.

Corporations will frequently hold multiple bank accounts with the same bank in the same currency. Often these accounts are held by individual subsidiaries or divisions of the corporation for the sole use of that business or legal entity. At any one time one or several of these accounts could be in deficit (overdraft) and pay debit interest to the bank, whilst at the same time other accounts could be in surplus (credit) and be earning credit interest. Given that credit interest is lower than debit interest, the corporation overall will forgo the 'spread' between the credit and debit interest on any offsetting long and short positions.

Historically, banks have been asked by their clients to calculate the various benefits of implementing a pooling structure for their organization. Typically, this process began by the client supplying historical data of the daily cash position for each of the individual entities it was intending to pool. For the analysis to be in any way representative, at least 3 months data, ideally more, was required. If the company was subject to seasonal variations, such as a manufacturer of ski equipment, account data representing anything less than a 12 month period would possibly be questionable. The financial data for each entity (e.g., division) within the company would need to be collected over the same period With this historical financial data in hand, the bank would then calculate the interest earnings and costs that each of these entities would have earned or incurred acting as stand-alone entities with their stand-alone cash positions over that historic period. The bank then calculated the interest earnings and costs that would be realized if the separate accounts had been pooled over this same period of time. The calculated interests and costs of the non-pooled accounts would then be compared to the interest earnings and costs which would have been earned or incurred had the accounts of these entities been pooled together over that historic period. The (presumably) increase in bank interest and decrease in associated costs would be said to be the pooling benefit.

There are a number of drawbacks with this traditional prior art approach for measuring the benefits of pooling. The traditional analysis is conducted on historic data which will inevitably contain one-time irregularities that will distort the data. The traditional analysis measures best case versus a do-nothing strategy. In practice, in the absence of any other liquidity structure, most treasurers would at least be taking some ad-hoc measures to share liquidity across the group using, for example, intercompany term loans. This oversight in the prior art techniques tends to diminish the validity of this analysis in the eyes of any but the most naive of treasurers. Finally, the prior art analysis will only show a pooling benefit if some of the entities have a cash deficit coincident with a surplus cash position in other entities.

SUMMARY OF THE INVENTION

The present invention solves the problems of the prior art as described above by recognizing that the prior art's biggest drawback is that the traditional approach determines the benefits of pooling only by measuring the direct interest gain and direct cost saving. In contrast to the prior art, the system and method of the present invention incorporates and analyzes the beneficial impact pooling can have in areas such as: reduced volatility of cash balance; cash forecasting; the ability to reduce the overall cash required to run the business; and the positive impact all of the above can have on earnings and the balance sheet.

The system and method of the present invention quantifies the working capital benefit of pooling using standard statistical techniques, and at the same time overcomes many of the difficulties inherent in the traditional pooling benefit measurements. The present system and method requires less data as the analysis relies on understanding the volatility of the cashflow in a given entity. These cashflow data tend to be reasonably constant over time so shorter data periods can be analyzed (i.e., less data). While still conducted using historical data, the method of the present invention is a much more accurate predictor of future periods. The method works even if the historic cash balances are unrepresentative of the steady state. A pooling benefit will be evident even if all entities have a long cash position all of the time. The pooling benefit determined by the present invention is similar whether the group has a do-nothing policy with regard to cash management, or has a very active cash management strategy which attempts to manage the individual entity's cash positions using intercompany loans.

One significant aspect of the present invention is its recognition of the fact that although a company's cash balance fluctuates on a daily basis, over time the distribution of the balance conforms to a Normal distribution. The pattern of a Normal distribution is followed both for the cash flow of individual companies without pooling, and the cash flow of a consolidated (pooled) cash account.

Given that the cash balances follow a Normal distribution, a company's cash flow is bounded by the mean of the distribution plus or minus the standard deviation multiplied by 2.3. This implies that the company must keep at least 2.3 times the standard deviation to ensure having enough cash to fund the company's operations. For n companies (e.g., n subsidiaries of a larger corporation) the minimum aggregate cash required is therefore 2.3 times the sum of the respective standard deviations of the separate companies.

In its pooling analysis, the present invention determines that the average (mean) cash balance of the pooled account is the sum of the means of each of the individual accounts. Similarly, the standard deviation of the pooled account is the square root of the sum of the squares of the standard deviations of the individual accounts. Accordingly, the present invention determines the minimum cash level of the pooled account to be 2.3 times the square root of the sum of the squares of the standard deviations of the individual accounts.

In order to determine the benefit of pooling the present invention determines the difference between the minimum aggregate cash required by the separate companies and the minimum cash required in the pooled account. If pooling is to be beneficial, from a working capital perspective, the minimum cash required in the pooled account will be significantly less than the aggregate cash required by the separate companies.

BRIEF DESCRIPTION OF THE DRAWING(S)

For the purposes of illustrating the invention, there is shown in the drawings a form which is presently preferred, it being understood however, that the invention is not limited to the precise form shown by the drawing in which.

DETAILED DESCRIPTION OF EMBODIMENTS OF THE INVENTION

Figure 1:
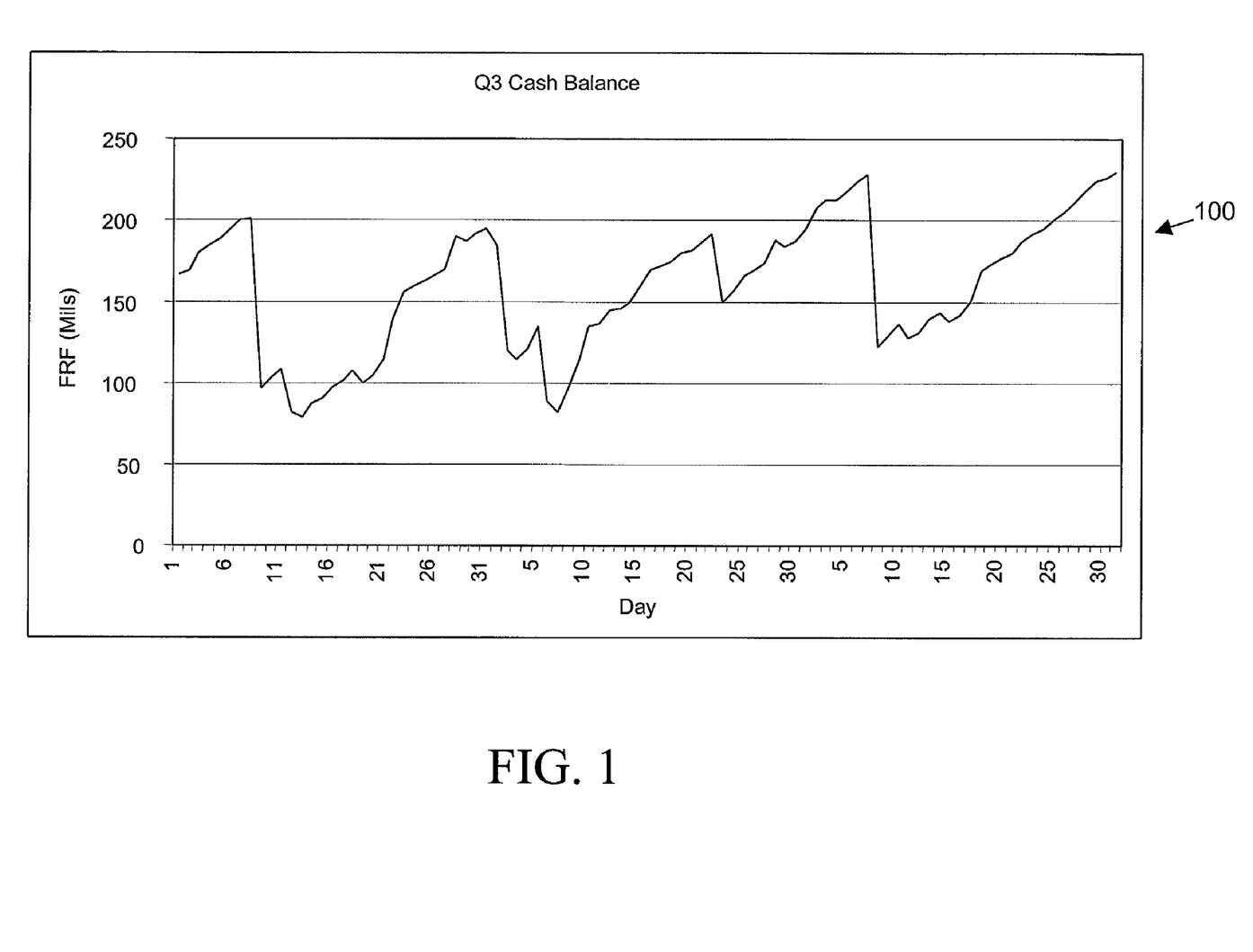
FIG. 1 illustrates an example of historical cash balances for a hypothetical sales company over a calendar quarter.
Figure 2:
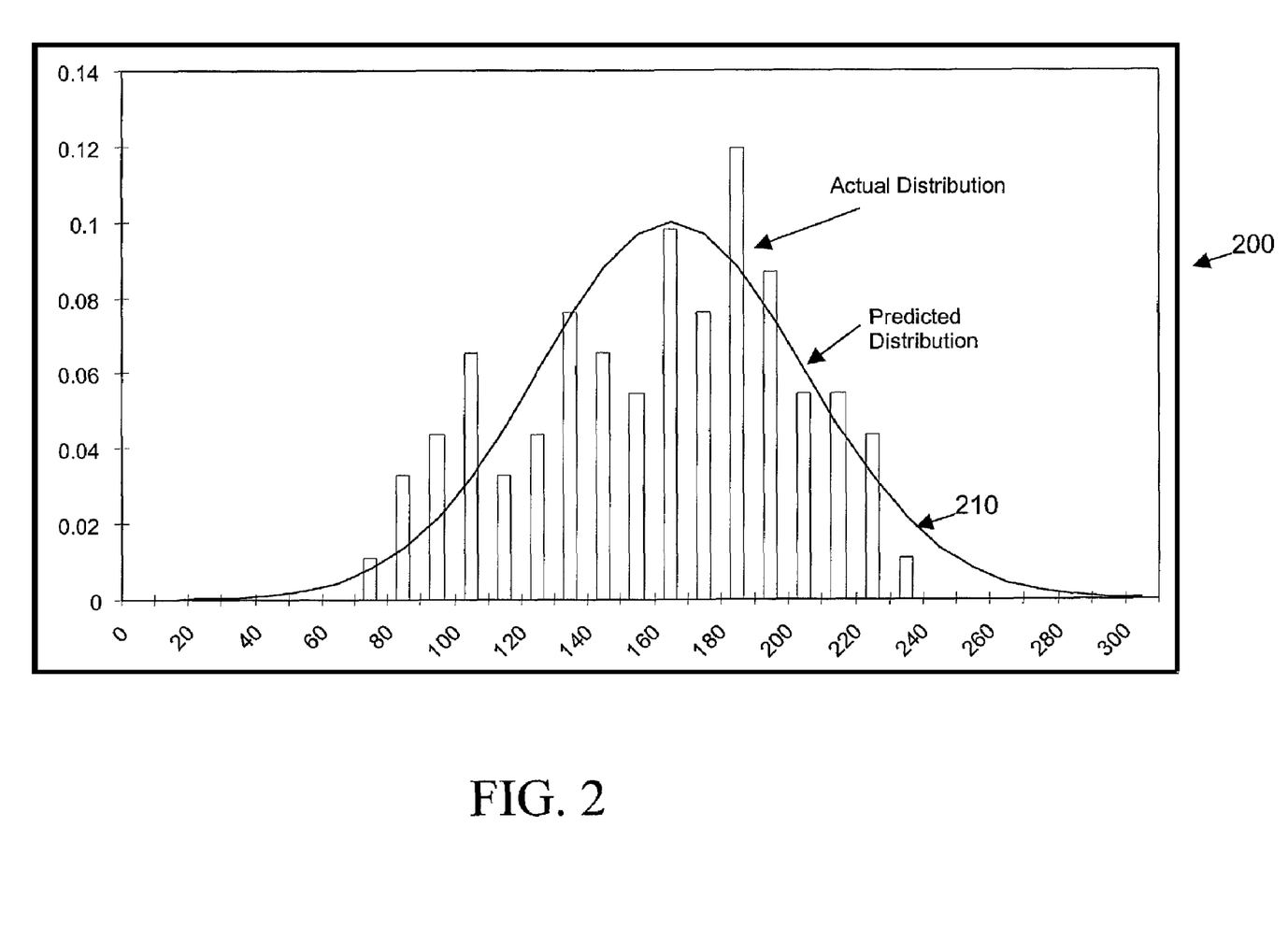
FIG. 2 depicts the right the historical data of FIG. 1, plotted as a statistical distribution.

In a preferred embodiment of the method of the present invention, it is assumed that the volatility of cashflows in an entity follow a Normal distribution. That is, statistical analysis of short term cash flows will show that they approximate to a standard bell curve. FIG. 1 illustrates the historical cash balances 100 for a hypothetical sales company over the third quarter of a calendar year. In FIG. 2, the historical data from FIG. 1 has been plotted as a statistical distribution 200. A Normal distribution 210 is superimposed on this distribution 200. The Normal distribution 210 has the same statistical characteristics, (the same mean and standard deviation) as the statistical distribution 200.

Figure 3:
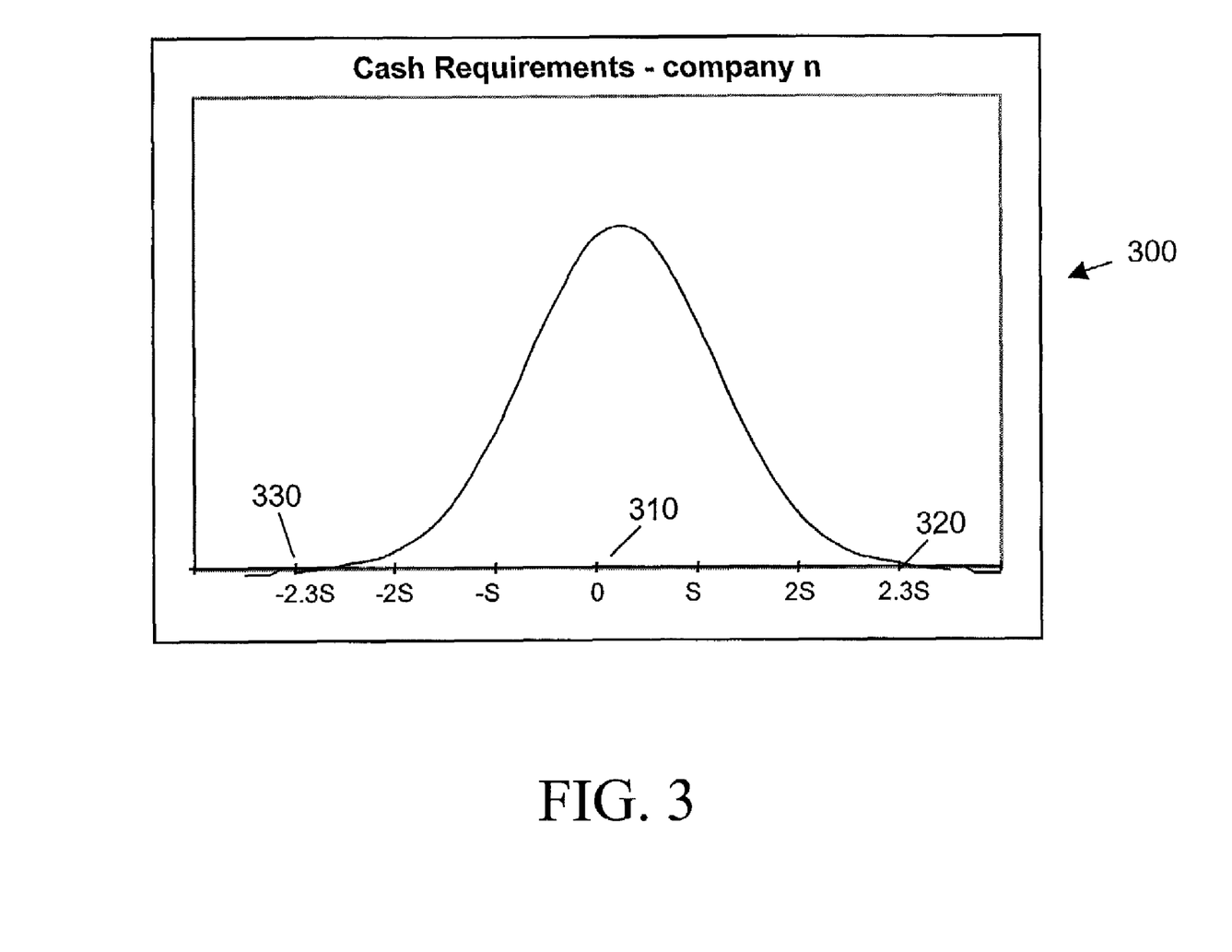
FIG. 3 illustrates a Normal distribution, including an indication of the standard deviations.

As can be seen from FIG. 2, the historical data for the company's cash balance approximates to the Normal distribution 210, but in this case it is slightly skewed because the particular hypothetical company was building cash over this period. In the steady state, most companies show an even better fit to the Normal distribution than is illustrated in FIG. 2.

Where a company's cash levels can be represented by a Normal distribution, some reasoned assumptions about their cash levels can be made based on the characteristics of this distribution. One of the key assumptions concerns the width of a normal distribution. FIG. 3 illustrates a Normal distribution 300. Ninety nine percent of the area of the Normal distribution 300 lies within 2.3 standard deviations 320, 330 of the mean 310. In other words, 99% of measurements in a Normal distribution are within the areas bounded by the mean 310 plus or minus 2.3 standard deviations 320, 330. In the example above the mean (average) 310 cash level is zero, and the standard deviation is S 320, 330.

When the Normal distribution 300 represents the cash balance of a company, this means that the company will need to plan to have a cash balance each day of 2.3 times their standard deviation 320 in order to be sure of having enough cash to fund the operational uncertainties of the corporation.

In the present invention, it is assumed that there exists a group of related companies (e.g., divisions, subdivisions . . . ) each with their own accounts. Assuming there are 'n' different affiliates, the cashflows in each of the n accounts approximate to a Normal Distribution.

One of the first steps undertaken in the method of the present invention is to determine the minimum cash balances required by the n separate companies, prior to pooling. The cash balances of each of the n affiliates is different, and has different characteristics. These characteristics are be represented as follows:

Average (Mean) cash balance=$A(x)$

Standard Deviation=$S(x)$

Number of entities=n

On any given day the minimum cash with which the company can operate is:

$$\text{Minimum cash level} = 2.3 \times \{S(1) + S(2) + \cdots + S(n)\}$$
$$= 2.3 \times \sum \{S(n)\}$$

The next step in the process is to determine the minimum cash balance required in the pooled account. Once this same group of n companies engaged in some sort of pooling mechanism, the balances would be consolidated each day. In this case the characteristics of the consolidated cashflows would still approximate to a Normal distribution with the following characteristics:

Average (Mean) cash balance= $\{A(1)+A(2)+\cdots+A(n)\}$ $$\text{Standard Deviation} = \frac{\text{Sqr. root of \{sum of}}{\text{squares of the Std. deviations\}}}$$
$$= \sqrt{\{S(1)^{\wedge}2 + S(2)^{\wedge}2 + \cdots + S(n)^{\wedge}2\}}$$
$$= \sqrt{\sum \{S(x)^{\wedge}(2)\}}.$$

The minimum cash level required to fund the operation of the n companies using the single pooled account each day are now given by:

Minimum cash level=$2.3 \times \sqrt{\Sigma\{S(x)^{\wedge}2\}}$

And the reduction in minimum cash level from the n separate accounts and the single pooled account is given by:

Reduction in min. cash level=$2.3 \times [\{\Sigma\{S(n)\}\} - \sqrt{\Sigma\{S(x)^{\wedge}2\}}]$ This reduction in the minimum required operational cash is a benefit of pooling that has been completely overlooked by the prior art. Very few treasurers would regard cash as being working capital. Indeed many financial institutions, when analyzing company balance sheets, deliberately exclude cash from the working capital equation. What the present invention clearly shows however, is that there is a minimum cash level for every company, determined by the volatility (standard deviation) of it's cashflow, below which a company must not allow it's cash to fall. Treasurers and cash managers instinctively know what this level is, and will always plan each day to have this much cash in case of uncertainties. As shown above, though, this 'seat of the pants' method of operation will mean on average, however that too much cash is 'tied up' in the business. Multiplied across all the entities of a group this amounts to:

Minimum cash level (without pooling)=2.3×Σ{S(n)}

However when a company pools the individual balances of the entities together the minimum cash level reduces to:

Minimum cash level (with pooling)=2.3×√Σ{S(x)^2}

It is useful to note that this reduction in the cash required is in no way related to the average cash balances of the companies involved and is not affected by their cash being positive or negative. Also, this method does not negate the interest savings which would be measured using the traditional pooling benefit determination. The working capital benefit can be considered as additional to the interest gains.

A simple example of the benefit of the method of the present invention will serve to show just how much value (cash being released from the business) has been created by pooling.

To keep the determinations simple, let us assume we have a corporation which consists of ten individual affiliates. Each of these affiliates has an average cash balance of $10 million. As described above though, day to day, the cash balances are subject to uncertainty (volatility, standard dev.=$1 million).

| | |
|---|---|
| Average A, (mean) cash level | = $10 million |
| Volatility S, (standard deviation) | = $1 million |
| Number of entities n, | = 10 |
| Each of the ten entities will plan daily cash of | = $2.3 × {S} million |
| | = $2.3 × {1} million |
| | = $2.3 million |
| Overall the ten entities will hold total cash | = 2.3 × ({S(1) + S(2) + -- + S(10)} |
| | = 2.3 × (10) million |
| | = $23.0 million |

Therefore, without pooling, the ten entities combined must hold cash balances of $23 million.

If the entities are pooled then the distribution would again approximate to a normal distribution as described above where:

Furthermore, in conjunction with the prior art methods, it can be shown how the interest expense of the pooled account is reduced, while at the same time we showing how the working capital required to run the business is also reduced. This action affects both the denominator and numerator of the Return on Assets equation by increasing profit and reducing assets. By using the method of the present invention of measuring the pooling benefit alongside the traditional method it can be demonstrated and quantified that pooling has a double multiplier effect on this key profitability ratio.

Figure 4:
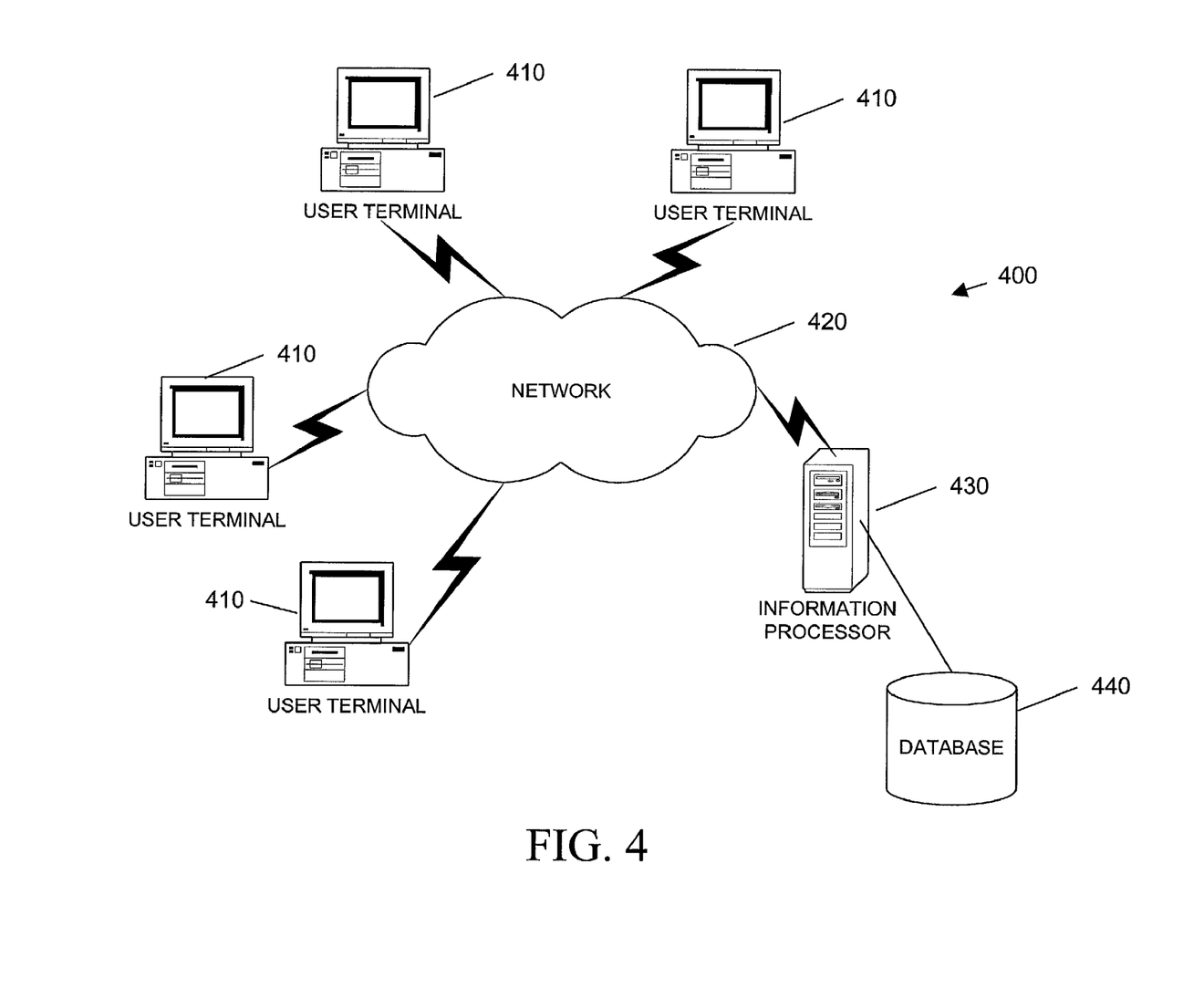
FIG. 4 is a system in accordance with the present invention.

FIG. 4 illustrates a system 400 according to the present invention. Users (typically clients of a bank) who are interested in performing the method of the present invention can use their user terminals 410 to access information processor 440 through a network. In a preferred embodiment, the user terminals 410 are personal computers, the network 420 is the Internet and the information processor 430 is a server hosting a website for performing the method of the present invention (note, the term website will be used interchangeably with the information processor 430).

Users log onto the website 400 using name and password. New users register their logon details and be assigned a password. Input of data by the users is a two stage process. The first stage is to identify the name, currency and number of balance records for each of the accounts, and the second stage is to input the daily balance data for each of the accounts the user is intending to pool. Input is preferably typed directly into a familiar spreadsheet format, but can be copy/pasted from another spreadsheet or Electronic Banking system. Data input by the user is stored in database 440.

The data required to be input by the users includes: the number of accounts to be pooled (n); a time series of consecutive daily balance data for each of these accounts for a representative period (up to 3 months); the currency of each data set; interest spreads for each individual account; and the pooling interest spread.

Once the data has been input by the user, the information processor 430 executes the above described method in order to determine: the stand deviation of each data set (s); the mean of each data set (m); the 'R-squared' of each data set versus the best fit distribution. The processor 430 then determines

| | |
|---|---|
| Average A, (mean) cash | = $[A(1) + A(2) + -- + A(n)} |
| | = ${10 + 10 + -- + 10) |
| | = $100 million |
| Volatility S, (std. deviation) | = $√Σ {S(x)^2} |
| | = $√Σ{1 × 1 + 1 × 1 + -- + 1 × 1) million |
| | = $√{10} million |
| | = $3.16 million |
| Overall the minimum cash level of the pooled account | = 2.3 × S |
| | = $2.3 × 3.16 million |
| | = $ 7.27 million |

Therefore, the method of the present invention clearly shows that the minimum planning level of cash required to keep the business liquid is reduced from $23 million to $7.27 million as a result of pooling. A release of cash, or a reduction of working capital of $15.7 million. As a consequence of pooling, volatility and uncertainty is reduced overall, with the average standard deviation moving down from +/−10 million to just +/−3.16 million. This reduction has benefits in terms of both cash forecasting and planning. Neither of these benefits were taken into consideration with the traditional pooling benefit analysis of the prior at.

whether the number of data elements (sample size) in each data set is statistically significant. Finally, the processor determines the reduction in volatility (ΔS) which, as described above is the square root (sum of squares of std deviations) less the sum of std deviations.

Optionally, the information processor 430 can perform the calculation of the spread saving in accordance with the traditional pooling benefit analysis.

As an output, the processor 430 produces a graphical representation of each data set (as seen in FIG. 1 above) and graphical representations of the statistical distribution of each data set overlaid with the best-fit distribution (as seen in FIG. 2 above). In addition to the presentation of the graphical representations, processor 430 also outputs a textual summary of the characteristics of each data set (s, m, Best-fit distribution, R squared) in original currency and in euros if desired. Finally, processor 430 textually provides a summary of the pooling benefit including the liquidity benefit, the interest benefit (optional) and an estimate of the accuracy (applicability) of the technique.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computer-implemented method for determining a benefit of pooling separate cash accounts into a single pooled account, the method comprising:
   determining separate minimum cash balances required in the separate cash accounts;
   aggregating the separate minimum cash balances into an aggregated minimum cash balance;
   determining by computer a pooled minimum cash balance required in the single pooled account; and
   determining a difference between the aggregated minimum cash balance and the pooled minimum cash balance, wherein the difference is a benefit of pooling.

2. The method as recited in claim 1, wherein the step of determining the separate minimum cash balances comprises: multiplying a standard deviation of a cash balance in each of the separate cash accounts by 2.3.

3. The method as recited in claim 2, wherein the number of separate cash accounts is n, and wherein the standard deviation of the cash balance in any one of the separate cash accounts is $S(x)$, the step of determining the separate minimum cash balances is given by $2.3 \times \Sigma\{S(n)\}$.

4. The method as recited in claim 1, further comprising: pooling the separate cash accounts into the single pooled account if the pooled minimum cash balance is less than the aggregated minimum cash balance.

5. The method as recited in claim 1, further comprising:
   receiving the number of separate cash accounts to be pooled; receiving daily balance data for each of the separate cash accounts;
   receiving an identification of a currency of the separate cash accounts; and
   receiving interest spreads for each of the separate cash accounts.

6. The method as recited in claim 5, wherein the daily balance data is a time series of consecutive daily balance data.

7. The method as recited in claim 6, wherein the daily balance data is for a representative period.

8. The method as recited in claim 7, wherein the representative period is up to three months.

9. A system for determining a benefit of pooling separate cash accounts into a single pooled account, the system comprising:
   a communication network;
   at least one user terminal coupled to the communication network; and
   an information processor coupled to the communication network, wherein the information processor is operable to:
     determine separate minimum cash balances required in the separate cash accounts, aggregate the separate minimum cash balances into an aggregated minimum cash balance, determine a pooled minimum cash balance required in the single pooled account, and determine a difference between the aggregated minimum cash balance and the pooled minimum cash balance, wherein the difference is a benefit of pooling.

10. The system as recited in claim 9, wherein the information processor is further operable to determine the separate minimum cash balances by multiplying a standard deviation of a cash balance in each of the separate cash accounts by 2.3.

11. The system as recited in claim 10, wherein the number of separate cash accounts is n, and wherein the standard deviation of the cash balance in any one of the separate cash accounts is $S(x)$, wherein the information processor is further operable to determining the separate minimum cash balances by determining $2.3 \times \Sigma\{S(n)\}$.

12. The system as recited in claim 9, wherein the information processor is further operable to:
   issue an instruction to pool the separate cash accounts into the single pooled account if the pooled minimum cash balance is less than the aggregated minimum cash balance.

13. The system as recited in claim 9, further comprising: an input interface, the input interface operable to:
   receive the number of separate cash accounts to be pooled, receive daily balance data for each of the separate cash accounts, receive an identification of a currency of the separate cash accounts, and receive interest spreads for each of the separate cash accounts.

14. The system as recited in claim 13, wherein the daily balance data is a time series of consecutive daily balance data.

15. The system as recited in claim 14, wherein the daily balance data is for a representative period.

16. The system as recited in claim 15, wherein the representative period is up to three months.

* * * * *